Dec. 18, 1962   C. B. OLSON   3,069,032
TRACTOR ATTACHED CARRIER
Filed Jan. 7, 1960   2 Sheets-Sheet 1

Clifford B. Olson
INVENTOR.

Dec. 18, 1962
C. B. OLSON
3,069,032
TRACTOR ATTACHED CARRIER
Filed Jan. 7, 1960
2 Sheets-Sheet 2
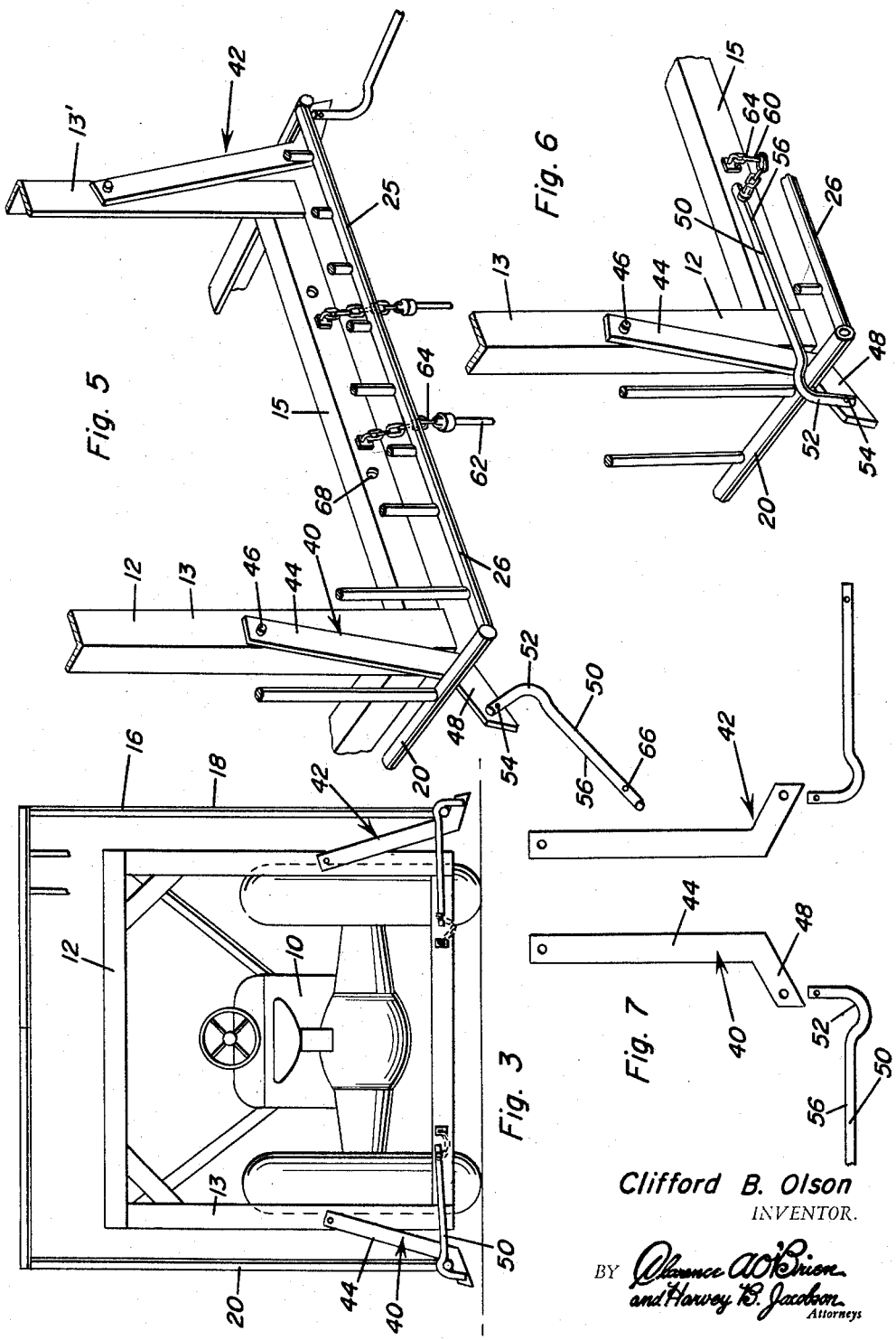
Clifford B. Olson
INVENTOR.

3,069,032
TRACTOR ATTACHED CARRIER
Clifford B. Olson, Britton, S. Dak.
Filed Jan. 7, 1960, Ser. No. 1,130
5 Claims. (Cl. 214—131)

This invention relates to agricultural equipment and more particularly to improvements in available hay handling equipment.

An object of the invention is to provide improvements in the manner of lifting and connecting a haystack rack to a tractor for moving the rack.

There are commercially available racks for stacking hay, and these racks are ordinarily used with another type of commercially available tractor front end loader which serves a number of purposes, one of which is to lift hay for front end loading, and to elevate the front end of the rack slightly to move it from one place to another in a field or to and from a field.

Considerable difficulty is encountered in the transportation of the conventional rack. Although the front end thereof, in some manufacturers' makes, is equipped with skids, the back end often objectionably drags across the ground. Accordingly, an object of this invention is to provide means for automatically elevating the front end of the rack at the same time that the rear end is stationary, and further means to lift and lock the rear end of the rack in an elevated position. In this way the rack is clear of the ground and can be moved about much more easily by the tractor on which it is mounted.

Briefly, the invention is embodied in a pair of levered clamps specifically connected to the rear part of the tractor mounted implement and made to couple to the rear part of the rack after the rack is lifted by the levers of the clamps, thereby holding the implement and the rack securely fastened together in an elevated position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a rear view of the assembly shown in FIGURE 1, parts broken away in section to show otherwise obscure details.

FIGURE 5 is a fragmentary rear perspective view showing portions of the rack and the implement and particularly showing the bracket assemblies in accordance with the invention.

FIGURE 6 is a fragmentary perspective view of a corner of the assembly shown in FIGURE 5.

FIGURE 7 is an exploded elevational view showing some of the parts of the bracket assemblies.

Figure 1:
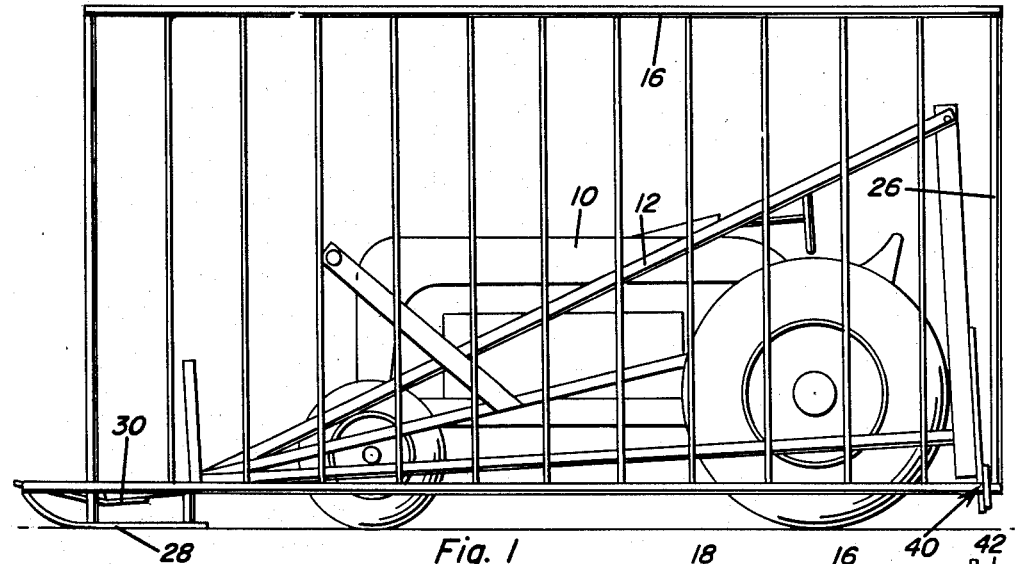
FIGURE 1 is a side elevational view of an ordinary tractor equipped with an implement of the type previously mentioned and a conventional rack with the rear end thereof held elevated by means of bracket assemblies in accordance with the invention.
Figure 2:
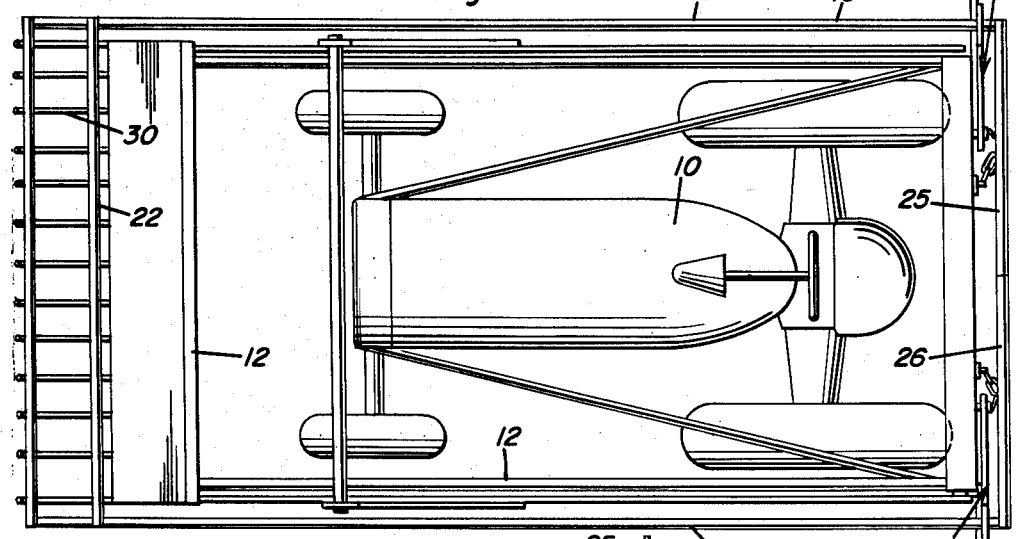
FIGURE 2 is a top view of the assembly shown in FIGURE 1.

In the accompanying drawings reference is first made to FIGURES 1–4 showing a conventional tractor 10 equipped with a conventional implement or front end loader 12 and either engaged with or in the process of being engaged with (FIGURE 4) a conventional rack 16. The rack is used as an aid in stacking hay and is of open frame construction having sides 18 and 20 together with a front end 22 and one or more gates, for instance a pair of gates 25 and 26 at the rear. There are skids 28 at the front portions of the sides 18 and 20, and skids may also be provided at the rear portions thereof.

Implement 12 is an elevating and loading implement having forwardly projecting teeth 30 used as a lift for forking hay and for other purposes. The elevating power equipment, being conventional such as hydraulic motors, is not shown, although it is to be clearly understood that implement 12 is absolutely conventional and has an elevating mechanism either connected therewith or connected with the tractor lift. The teeth 30 of loader 12 are pivotally connected to the frame or body of the tractor by the longitudinally extending frame of the tractor. This pivot connection is preferably at the lower end of the tractor and loader frame.

One procedure for connecting rack 16 to the tractor is to open the gates 25 and 26 (FIGURE 4), chock-up the rear ends of the sides 18 and 20 and drive the tractor 10 into the rack between sides 18 and 20. The teeth 30 portion of the elevating implement 12 are engaged beneath the lower horizontal rail of the front wall 22 of the rack, and the implement 12 is then lifted to the extent that the front of the rack is raised from the ground. The rear end of the rack is then raised and locked to the tractor as explained below. The rear gates are either closed or left open and the tractor is driven forward thereby propelling the assembly consisting of implement 12 and rack 16. Even without lifting, the rack may be pushed on its skids 28 by the thrust transmitted from the tractor to the forward part of implement 12 and to the front wall 22 of the rack. In this case, locomotion of the rack is highly unsatisfactory.

Two simple bracket assemblies 40 and 42 respectively are mounted at the rear part of implement 12. Typical bracket assembly 40 is made of an arm 44 connected to upright 13 of implement 12 at the rear corner thereof. The arm 44 may be joined to member 13 by any suitable fastener, for instance bolt 46. The arm extends downwardly and outwardly slightly and terminates in a downwardly angled portion 48 which protrudes laterally outwardly from member 13. A second arm 50 functions as a lifting and locking lever. It has a hook 52 at one end whose extremity is connected by pivot 54 to portion 48 near the end thereof. The handle 56 of arm 50 is coupled to transverse brace 15 of implement 12, the transverse brace, as is conventional, being joined to the lower ends of upright members 13 and 13' of implement 12.

A very simple latch 60 is connected between arm 50 and transverse brace 15. One of the simplest types of latches is made of a pin 62 at the end of a short length of chain 64. The opposite end of the chain is welded or otherwise fastened to brace 15, and pin is arranged to pass through openings 66 and 68 in arm 50 and in transverse brace 15 respectively.

Figure 4:
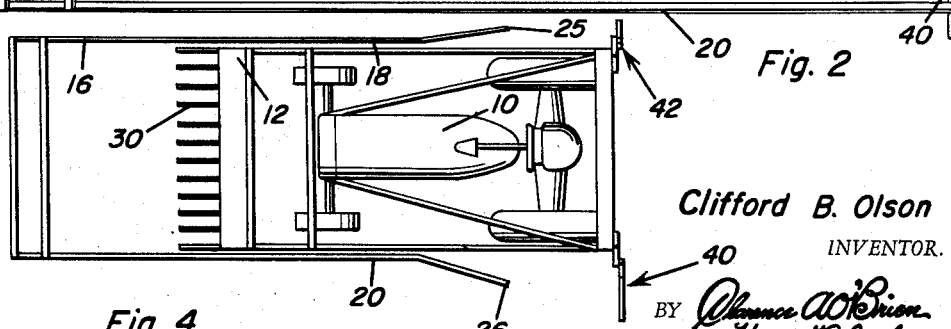
FIGURE 4 is a diagrammatic top view showing one procedure for engaging the implement with the rack.

One method of using my invention is shown in FIGURE 4. First, the ends of the sides 18 and 20 adjacent the gates 25 and 26 are chocked above the ground several inches by means of chocks located a foot or so inwardly from the hinges of the gates. Then the handles 50 of the hooks 52 are spread horizontally as shown in FIGURES 7 and 4 so that they may slide along the ground in this position and then the tractor is driven forwardly into the open end of the hay cage as illustrated in FIGURE 4. The prongs 30 of the loader 12 move under the lower edge of the forward end 22 of the hay rack, and the arms 50 slide beneath the free ends of the rack side walls 18 and 20. After the tractor is completely within the hay rack as shown in FIGURE 1, then the hooks 52 are placed directly below the lower horizontal rails or bars of the side walls 18 and 20. The operator then grabs the outer end of one of the handles such as the handle 50 shown in FIGURE 7, and lifts upwardly thereon. This causes the hook 52 to swing in a clockwise direction about the pivot point 54 and to engage the lower surface of the side 20. As the operator continues to lift the outer end of the arm 50, the side 20 is also lifted by the hook portion 52 until the normally vertically extending portion of the hook 52 which contains the pivot point 54 passes beyond a horizontal position, after which the side 20 slides inwardly from the hook 52 onto the sloping arm 48. The operator continues to rotate the arm 50 in a clockwise direction until it is in the position shown in FIGURE 6. This final movement of the handle 50 causes the side 20 to be forced up the inclined plane on the top surface of the sloping arm 48. Due to the length of the arm 50, the location of the hook 52 in relation to the pivot point 54 and the slope of the arm 48, the mechanism 40 provides a highly leveraged device whereby the operator may easily lift the side 20. After the arm 50 has been moved to the position shown in FIGURE 6, it is then locked in position by means of the locking pin 62 as illustrated. The opposite side 18 is lifted and locked in position by the levers 42 in exactly the same manner.

Another way of loading the hay rack onto the tractor is first to open the gates 25 and 26 and then pull the free hinged ends of the side walls 18 and 20 several feet apart. The free ends of the side walls may easily be pulled apart several feet because of the length and flexibility of the elongated horizontal rails comprising the side walls. Also, the side walls 18 and 20 may be pivotally connected to the vertically extending edges of the front wall 22. After the open ends of the walls 18 and 20 are spread apart, the tractor is then driven completely into the hay rack as illustrated in FIGURE 1. The assemblies 40 and 42 may be in their elevated or raised position while the tractor is being driven into the cage. When the tractor is being driven into the cage, the prongs 30 are inserted under the lower edge of the end wall 22 in the same manner as explained above. After the tractor is fully in the cage, then the assemblies 40 and 42 are unfolded and arranged substantially as shown in FIGURE 7, that is, the handles 50 are supported flat upon the ground and extend outwardly from the tractor. The free ends of the side walls 18 and 20 may then be pushed along the ground without lifting same until they slide into the notches or hooks 52. After the walls are in the hooks, the handles 50 are operated in the same manner as explained above to elevate and lock the side walls in the position illustrated in FIGURE 6.

Assemblies 40 and 42 are identical, although they need not be. In use, arms 44 of the two assemblies engage beneath the lower frame members of sides 18 and 20 of the rack as the implement 12 is elevated. Then, arms 50 are swung to the position at which the hook engages over the lower frame member of side 20 (FIGURE 6) and arm 50 is locked by means of lock 60. Thereafter the rear gates 25 and 26 may be closed. As implement 12 continues to lift, not only is the front part of the rack elevated, but also the rear part. Since the rack is completely lifted from the ground, it is much easier to transport.

It is to be understood that various changes may be made in the invention without departing from the concept thereof. For instance, different manufacturers' makes of implements 12 and different styles of the same manufacturer's make of implement require slightly different configurations for the arms of the bracket assemblies.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an assembly including a tractor with an implement movably mounted thereon, a horizontally extending projection mounted on the front end of the implement, operating means on the tractor connected to said implement so as to elevate a portion thereof and the projection, a rack which has spaced sides connected by a front, said tractor and implement adapted to fit between said sides and said projection adapted to extend under the front of said rack for elevating said front, the improvement comprising releasable support means for engaging portions of said sides to elevate the rear part of the rack, connecting means on the support means for connecting it to the tractor, lock means on said support means for locking said sides to said support means and tractor in an elevated position.

2. A device as defined in claim 1 wherein said support means includes a pair of elongated members extending generally vertically and located at the rear of said tractor on opposite sides thereof, the bottom of each of said members having a support surface extending downwardly and outwardly from the tractor for extending under one of said sides.

3. A device as defined in claim 2 wherein said lock means includes an arcuate hook pivotally connected at one end to the lower end of each elongated member, a lever secured to the other end of each hook and extending outwardly from the sides of the tractor when the hook is in an unlocked position, said lever and hook being rotatable upwardly toward said tractor so as to lift and secure one of said sides onto one of said support surfaces.

4. A device as defined in claim 3 wherein said lock means also includes means on said tractor for securing said levers to said tractor and said connecting means on the support means comprise horizontal pivot pins connected to the tractor.

5. In combination, a hayrack comprising a generally vertical wall structure enclosing and defining a chamber, a tractor within the chamber, power operated means at the front of tractor movable in a vertical direction, means connecting the power operated means to the tractor, the power operated means including means extending under a front portion of said wall, manually releasable means connecting a rear portion of said wall to the tractor in an elevated position, said wall including movable entrance means permitting entry and exit of said tractor.

References Cited in the file of this patent
UNITED STATES PATENTS

| | | |
|---|---|---|
| 977,575 | Way | Dec. 6, 1910 |
| 2,932,299 | Brandt et al. | Apr. 12, 1960 |